US008711966B2

(12) United States Patent
Schroeder et al.

(10) Patent No.: US 8,711,966 B2
(45) Date of Patent: Apr. 29, 2014

(54) WIRELESS DEVICE WITH EXTENDABLE ANTENNA

(75) Inventors: Werner L. Schroeder, Wiesbaden (DE); Aleksander Krewski, Mainz (DE)

(73) Assignee: Option NV, Leuven (BE)

( * ) Notice: Subject to any disclaimer, the term of this patent is extended or adjusted under 35 U.S.C. 154(b) by 341 days.

(21) Appl. No.: 13/116,605

(22) Filed: May 26, 2011

(65) Prior Publication Data

US 2012/0300871 A1 Nov. 29, 2012

(51) Int. Cl.
*H04B 7/02* (2006.01)

(52) U.S. Cl.
USPC .......................................................... 375/267

(58) Field of Classification Search
USPC ................. 375/260, 267, 295, 299, 316, 349; 343/700, 754
See application file for complete search history.

(56) References Cited

U.S. PATENT DOCUMENTS

| | | | | |
|---|---|---|---|---|
| 6,411,824 | B1 * | 6/2002 | Eidson | 455/561 |
| 6,456,238 | B1 * | 9/2002 | Posey | 342/427 |
| 8,374,273 | B1 * | 2/2013 | Zhang et al. | 375/267 |
| 2005/0186931 | A1 | 8/2005 | Laiho et al. | |
| 2007/0046547 | A1 * | 3/2007 | Crouch | 343/700 MS |
| 2007/0052587 | A1 * | 3/2007 | Cheng | 343/700 MS |
| 2008/0055164 | A1 * | 3/2008 | Zhang et al. | 343/702 |
| 2009/0009421 | A1 | 1/2009 | Suprunov et al. | |
| 2009/0251383 | A1 | 10/2009 | Tani et al. | |
| 2010/0120379 | A1 | 5/2010 | Fukagawa et al. | |
| 2011/0210787 | A1 * | 9/2011 | Lee et al. | 330/126 |

FOREIGN PATENT DOCUMENTS

EP 1 075 041 A2 7/2001

OTHER PUBLICATIONS

Y. Feng et al., "Simulation based comparison of metrics and measurement methodologies for OTA test of MIMO terminals", RheinMain University of Applied Sciences, Apr. 12-16, 2010.

Aleksander Krewski and Werner L. Schroeder, Equivalent Circuit Model for Closely Coupled Symmetrical Two-Port MIMO Antennas in Small Volume, Wiesbaden University of Applied Sciences, Jul. 11-17, 2010.

Werner L. Schroeder and Aleksander Krewski, "Total Multi-Port Return Loss as a Figure of Merit for MIMO Antenna Systems", Proceedings of the 3rd European Wireless Technology Conference, Sep. 27-28, 2010.

Aleksander Krewski et al., "Bandwidth Limitations and Optimum Low-band LTE MIMO Antenna Placement in Mobile Terminals Using Modal Analysis", Proceedings of the 5th European Conference on Antennas and Propagation (EUCAP), Apr. 11-15, 2011.

European Search Report issued in EP 11 16 711, Jan. 13, 2012, 5 pages.

* cited by examiner

*Primary Examiner* — Khanh C Tran

(74) *Attorney, Agent, or Firm* — Bacon & Thomas, PLLC

(57) ABSTRACT

A wireless device has receiver circuits and/or transmitter circuits supporting at least two simultaneous independent transmit paths in the same frequency band, and a multiport antenna with N ports, for the available receiver or transmitter circuits. The multiport antenna has a compact mechanical state and an extended mechanical state, and is connected to the N ports of the receiver and/or transmitter circuits by a 2N-port matching and decoupling network. This has multiple, selectable electrical states, each corresponding to at least one of the mechanical states. One combination of the mechanical state and the electrical state allows operation in a wireless channel of rank N. A second combination of the mechanical state and the electrical state allows operation in a wireless channel of rank less than N. Better MIMO performance with the extended antenna configuration can be obtained with the convenience of retaining limited performance when the user cannot use the extended antenna.

20 Claims, 12 Drawing Sheets

FIG 1[a] – extended state
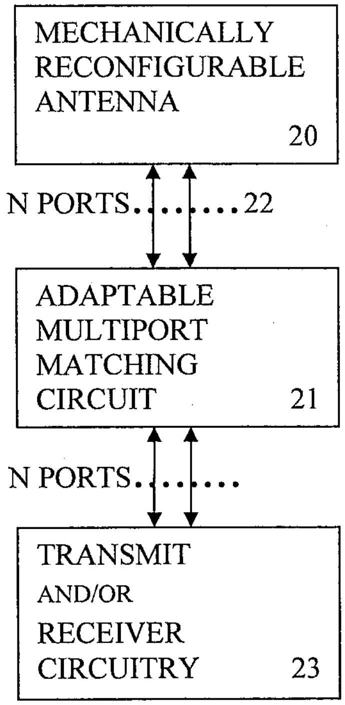
FIG 1[b] – compact state
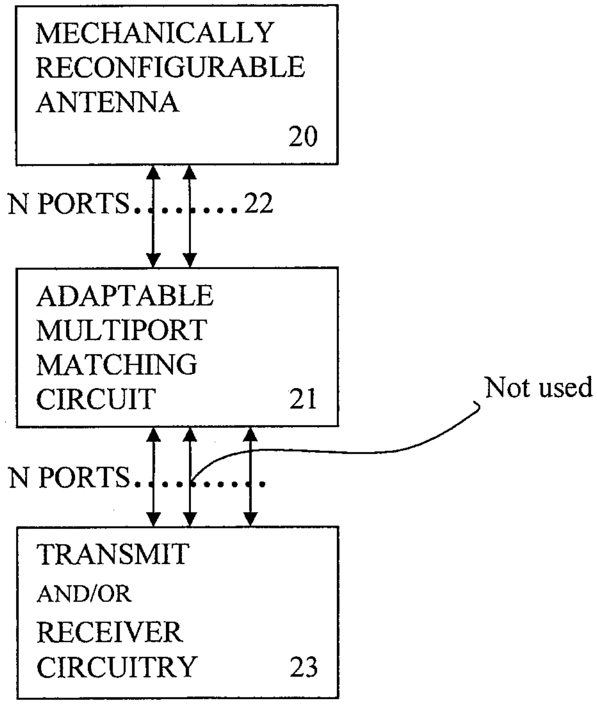

WIRELESS DEVICE WITH EXTENDABLE ANTENNA

FIELD OF THE INVENTION

This invention relates to wireless devices having receiver and/or transmitter circuits, and a mechanically reconfigurable antenna, and to corresponding methods of using such devices.

BACKGROUND

Multiple Input—Multiple Output (MIMO) transmission modes are a common feature of state-of-the-art wireless communication systems. They are in particular basic to the mobile communication standards Evolved Universal Terrestrial Radio Access (E-UTRA) (Long Term Evolution (LTE)), Worldwide Interoperability for Microwave Access (WiMAX) and High-Speed Packet Access (HSPA) but also relevant for Wireless Local Area Network (WLAN) communications and in other applications. Explanations of MIMO transmission modes can be found in "Introduction to space-time wireless communications" by Paulraj et. al, ISBN 0 521 82615 2.

So as to support MIMO transmission modes such as Receive Diversity (RD) and Spatial Multiplexing (SM), a mobile terminal or wireless modem must be equipped with at least two antennas, providing a two port antenna system, and in the general case a multi port antenna which is designed to receive (or transmit, respectively) signals from different ports independently of each other in the same frequency band. For receive mode "independently" means that the different ports of the multiport antennas are capable of receiving different superpositions of incoming multi-path components which requires that their polarimetric, complex radiation patterns are sufficiently distinct. A quantitative measure of this capability is the correlation between signals received at different antenna ports in a given reference propagation scenario.

An often applied metric is the Complex Envelope Correlation Coefficient (CECC) between two antenna signals in the isotropic Rayleigh propagation scenario. Due to the principle of reciprocity which applies to antennas the statements apply analogously to transmit mode operation.

A key performance metric of an antenna for a mobile terminal or wireless modem is its bandwidth at a given desired frequency of operation. Other important metrics like radiation efficiency are for physical reasons strongly correlated with bandwidth (provided that good engineering practices are applied). The bandwidth of an antenna is physically limited by its size. If the physical size of an antenna becomes much smaller than the free-space wavelength of an electromagnetic wave at the frequency of operation, the bandwidth of an antenna decreases roughly in proportion to the third power of its largest dimension. For a multiport antenna for MIMO transmission, the smallest bandwidth seen at any of its ports, will limit the MIMO operation. In the context of mobile terminals and wireless modems the largest dimension is to be understood as the largest dimension of the combined arrangement of the nominal antenna and the conductive structure of the device (e.g. mobile phone or laptop) to which it is attached and on which a current density may be excited by the antenna (transmit mode) or to whose excitation by an incoming electromagnetic wave it couples (receive mode). This coupling between antenna and conductive chassis is essential for almost all practical small mobile devices. Their antennas would not provide the required bandwidth otherwise.

The exploitation of the conductive chassis of a mobile device as an antenna extension can be described as the excitation of characteristic modes of the chassis. The radiation pattern of the antenna-chassis combination is given by the respective characteristic modes. So as to achieve the above mentioned "independency" coupling) between multiple antenna ports in a MIMO antenna system for a mobile terminal or wireless modem, different superpositions of characteristics modes must be excited (transmit mode) by different antenna ports. This is relatively easy to achieve if the structure is "large" (at the order of half a wavelength) in at least two dimensions and if antenna elements can be spaced at sufficiently "large" distances along the periphery of the conductive chassis.

Unfortunately this is not the case for small size wireless modems such as e.g. realized in Express Card format or in the form of a Universal Serial Bus (USB) dongle attached to a laptop particularly at frequencies below 1 GHz. The antenna within the modem is then located within a single small volume at one edge of the laptop. The result is that one antenna port shows a wide bandwidth while a second or further ports show relatively small bandwidth. In particular it turns out that the required instantaneous bandwidth for MIMO coverage of low-frequency E-UTRA band classes is not attainable within the physical size of an Express Card or USB stick.

For the realization of efficient multi port antenna systems in such devices it is therefore mandatory to extend the volume for a second or further antenna ports over the limits of an Express Card or USB stick. Unfortunately, this approach leads to bulky devices and is in conflict with customer expectations and typical use cases for mobile devices such as use of a laptop in a train.

The problem was less severe in the past when multiport antenna systems in mobile devices were predominantly designed for frequencies of operation near 2 GHz. It is a more severe problem now as frequency bands in the range from 698 MHz to 960 MHz are employed for MIMO transmission. In existing devices (mainly designed for RD and not for SM mode and mostly at higher frequencies) the concept of a primary (good) and a secondary (poor) antenna is often followed. But for SM operation all antennas should have comparable performance in terms of bandwidth and efficiency.

In some other "MIMO" devices, only a single antenna is integrated within the wireless modem and an external connector is foreseen to attach a second antenna. This solution must be rated as extremely inconvenient from a user's point of view since he/she has to carry and assemble additional equipment for mobile use. It is makes matching more difficult.

SUMMARY

An object of the invention is to provide improved apparatus or methods. According to a first aspect, the invention provides:

Wireless communication device having receiver circuits supporting at least two simultaneous receive paths in the same frequency band and/or transmitter circuitry supporting at least two simultaneous transmit paths in the same frequency band, and having a multiport antenna with at least two ports but in general a number N of ports, equal to number N of the available receiver or transmitter circuits in the device, said multiport antenna having multiple mechanical states, comprising at least a compact mechanical state and one extended mechanical state, and being connected to the N ports of the receiver and/or transmitter circuits by means of a 2N-port matching and decoupling network, which has multiple, selectable electrical states, each corresponding to at least one of the mechanical states of the multiport antenna system such that there is at least one combination of the mechanical state of the multiport antenna system and the electrical state of the matching and decoupling network which allows for receive and/or transmit operation in a wireless channel of rank N, equal to the larger of the numbers of available receiver or transmitter circuits and to the number of antenna ports, and at least a second combination of the mechanical state of the multiport antenna and the electrical state of the matching and decoupling network allowing for receive and/or transmit operation in a wireless channel of rank less than N.

By such adapting between different combinations of the states, the different possible configurations of the antenna can be exploited more effectively. Better multiport performance can be obtained with the convenience of retaining limited performance when a user can't easily use some mechanical states, such as an extended antenna, e.g. when travelling. Reference to rank of a channel is intended to express in relative terms how many streams in spatial multiplex are usable to maximise a throughput, for given conditions such as modulation, coding, SNR, and so on, so that the rank is N if the throughput realizable using N streams in spatial multiplex is higher than with any scheme using less than N streams.

Any additional features can be added or disclaimed from the aspects. Some embodiments have a coupling or control mechanism by which selection of one of the different mechanical states of the multiport antenna automatically triggers the selection of the corresponding electrical state of the matching and decoupling network, or vice versa, to adapt the device between the first and the second combinations of the states. This can help simplify the operation of the device for the user.

In some embodiments, the coupling mechanism is operable by direct mechanical action such that a mechanical state change of the multiport antenna causes selection of the corresponding electrical state of the matching and decoupling network, to actuate one or more switches and/or to mechanically induce a change of electrical parameters of reactive or distributed circuit elements within the matching and decoupling network or the antenna or both. This can help avoid the need for a controller and thus keep the construction simpler and reduce costs.

In some embodiments, there is an electrical coupling mechanism having a sensor for sensing the mechanical state of the multiport antenna, and having circuitry to trigger the selection of the corresponding electrical state of the matching and decoupling circuit according to an output of the sensor, the circuitry having electrically controlled switching elements and/or electrically tunable reactive and/or distributed circuit elements within the matching and decoupling network or the antenna or both. This electrical control may be more complex and may be more expensive, but can avoid some of the disadvantages of mechanical coupling.

In some embodiments, there is a manually controllable mechanism for selection of the mechanical state of the multiport antenna and/or the matching and decoupling network. This can be user friendly, and simpler than automated examples.

In some embodiments there can be an adaptation controller, operable to control the selection of mechanical state of the multiport antenna and/or the selection of the electrical state of the matching and decoupling network based on any one or more of the following: on measurements of received and/or transmitted signals, on measurements of electrical properties of the multiport antenna and/or the matching and decoupling network such as impedances or scattering parameters, on information about receive and/or transmit conditions supplied by the digital baseband, on information about near-field environmental conditions potentially detected by sensors, information received from another station or the base station of a network with which the device can communicate, or any combination thereof, wherein the device comprises any one or more of electro-mechanical actuators, electrically controlled switching elements and/or electrically tunable reactive and/or distributed circuit elements controllable by the adaptation controller for carrying out the selection of the mechanical state of the multiport antenna and or the selection of the electrical state of the matching and decoupling network. This can be more convenient than manual operation and can enable more complex adaptations. The adaptation controller can be implemented by for example a program controlled processor arranged to control the adaptation of the adaptive matching circuit. This can enable more complex control.

In some embodiments, the device can be integrated into a removable module for use with a mobile computing device. This is one application where there is demand for better MIMO reception and for the convenience of maintaining good operation when there is limited space and it is inconvenient to use an extended antenna.

Another aspect of the invention provides a wireless communication device having receiver circuits supporting at least two simultaneous receive paths in the same frequency band and/or transmitter circuits supporting at least two simultaneous transmit paths in the same frequency band, and having a multiport antenna with at least two ports and a sufficient number of ports, N, for available receive or transmit paths, said multiport antenna having multiple mechanical states, comprising at least a compact mechanical state and one extended mechanical state, and being connected to the N ports of the receiver and/or transmitter circuits by means of a 2N-port matching and decoupling network, which has multiple, selectable electrical states, each corresponding to at least one of the mechanical states of the multiport antenna system such that there is at least a first combination of the mechanical state of the multiport antenna system and electrical state of the matching and decoupling network which allows for receive and/or transmit operation in a wireless channel of rank N, equal to the larger of the numbers of available receiver or transmitter circuits and to the number of antenna ports, and at least a second combination of the mechanical state of the multiport antenna and the electrical state of the matching and decoupling network allowing for receive and/or transmit operation in a wireless channel of rank less than N, the method comprising the steps of:

transmitting and/or receiving using the device in the first combination of states, adapting the device into the second combination of states, and transmitting and/or receiving using the device in the second combination of states.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 1*a* shows a schematic view of features of a first embodiment, with the antenna in an extended state FIG. 1*b* shows a schematic view of the first embodiment with the antenna in a compact state, with some of the N ports not used.

DESCRIPTION OF THE PREFERRED EMBODIMENTS

Figure 2:
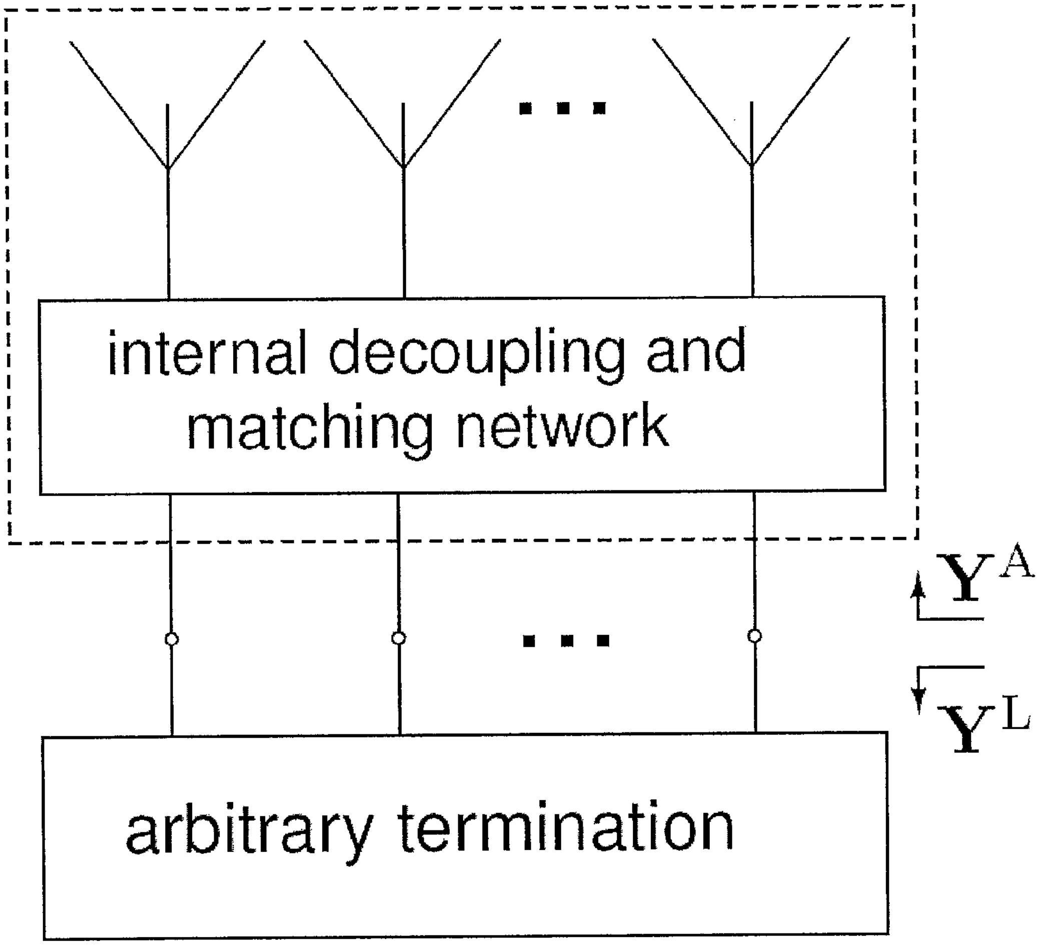
FIG. 2 shows a schematic view of a similar embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

References to programs can encompass any kind of program in any suitable language and stored in any kind of store, local or remote, volatile or non volatile, and accessible to the processor.

References to a processor can encompass any kind of processing hardware including an application specific integrated circuit (ASIC) module, a general purpose processor, a personal computer, a digital signal processor and so on.

References to a multiport antenna are intended to encompass any arrangement of one or more radiator structures having two or more non identical radiation patterns, encompassing monopole or dipole structures, encompassing one radiating structure having multiple ports for different signals, and encompassing several radiating structures with N ports, in which case the multiple radiating structures are close enough not to be independent antennas, completely decoupled, and thus needing a multiport matching circuit rather than being able to be matched independently.

References to operation in a multiport mode is intended to encompass operation using more than one signal, and can encompass spatial diversity operation where the same information is transmitted over multiple air paths, and can encompass spatial multiplexing where different information is transmitted over multiple air paths.

References to wireless devices can encompass any kind of device having the antenna, matching circuit and transmitter or receiver circuits as claimed, and so encompasses devices such as mobile phones, mobile computing devices, modules such as dongles or USB sticks or cards or circuit boards for use with laptops or other computing devices, and also encompasses products having wireless capabilities built in such as tracking devices for vehicles, containers or parcels for example, and can encompass the vehicles or containers themselves.

References to MIMO are intended to encompass transmission modes, for example transmit and receive diversity, spatial multiplexing and beam-forming as specified, for example for the E-UTRA standard Rel-8 in 3GPP TS 36.201 and 3GPP TS 36.211 through 36.214 and standard documents referenced therein.

Introduction to the Embodiments

By way of introduction, some issues with existing systems will be discussed first. A MIMO system transmits data over a matrix channel rather than just over a single radio channel. MIMO systems are very attractive in order to boost the capacity of a wireless-communication system that operates in a rich multipath environment. The major problem with adding more ports is a resulting reduction of the bandwidth over which useful MIMO operation can be obtained.

However, in a practical MIMO system the capacity is reduced due to correlation between the signals in the receiver. Therefore, the correlation between the signals that are received from the different antenna ports is an important parameter in a MIMO system, due to the tendency towards increased capacity as correlation decreases.

Correlation between ports of a multiport antenna can be measured in various ways.

MIMO performance can also be measured in other ways including parameters such as return loss, isolation between ports, efficiency in terms of low reflection from each of the ports.

FIGS. 1*a*, 1*b*, 2, Features of Embodiments

FIG. 1*a* shows a schematic view of features of a first embodiment, representing an example of the first combination of states. The device can be a transmitter and/or a receiver. A mechanically reconfigurable multiport antenna 20 is in an extended state and is coupled to an adaptable matching network 21. This couples and matches N ports 22 of the antenna to N ports of the transmitter and/or receiver circuits 23 respectively. The mechanically reconfigurable multiport antenna is reconfigurable between at least a compact antenna configuration and an extended antenna configuration. The adaptable multiport matching circuit can be adaptable to match electrically the ports either to the compact or to the extended antenna configuration. In operation, there can be steps of transmitting and/or receiving using the device in the compact antenna configuration, using the matching circuit to match electrically the multiport antenna with at least one of the ports of the receiver and/or transmitter circuits, followed by mechanically reconfiguring the antenna to the extended antenna configuration and adapting the matching circuit to match electrically two or more of the ports of the receiver and/or transmitter circuits with the antenna. Then transmitting and/or receiving respectively can be carried out using the device in the extended antenna configuration in a multiport mode.

FIG. 1*b* shows the same embodiment after adaptation, and represents an example of the second combination of states. The antenna is in a compact state, and the matching circuit is matching less than N ports.

FIG. 2 shows a schematic view of the same embodiment to explain the matching terms. This shows an antenna in compact or extended configuration, a matching network, and multiple ports and an arbitrary termination at the transmitter and/or receiver circuits. The matching circuit has an N-port admittance matrix $Y^A$ seen by the multiple ports. The arbitrary termination has a load admittance matrix $Y^L$ seen by the matching network.

For a multiport antenna, correlation depends on matching and that correlation is a property of both antenna and termination. For multiport cases, a lossless multi-port antenna has zero correlation between all ports in an isotropic Rayleigh environment under conditions of Hermitian match. A multiport antenna is matched (for maximum power transfer) by making its N-port admittance matrix $Y^A$ is equal to the Hermitian transpose of the load admittance matrix $Y^L$.

FIGS. 3-6, Further Features of Embodiments

Figure 3:
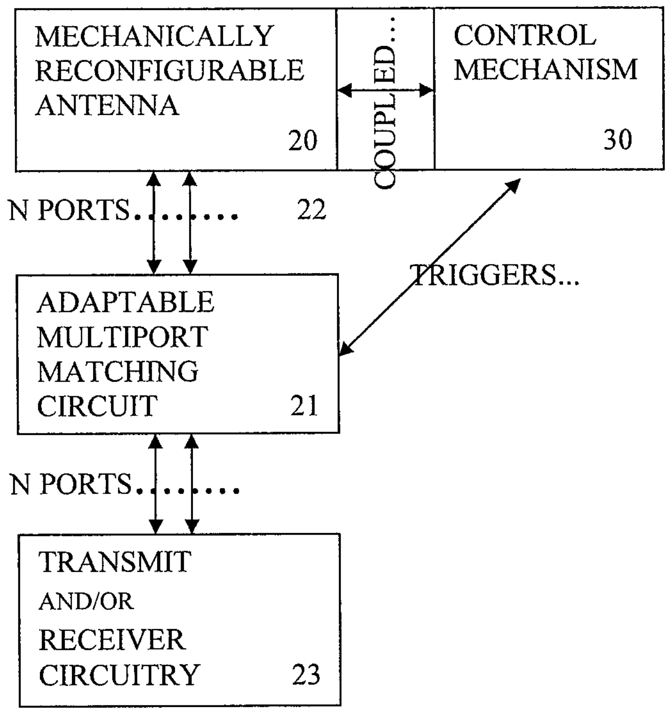
FIG. 3 shows features of a further embodiment having a mechanism for reconfiguring the antenna and triggering changes in the matching circuit.
Figure 4:
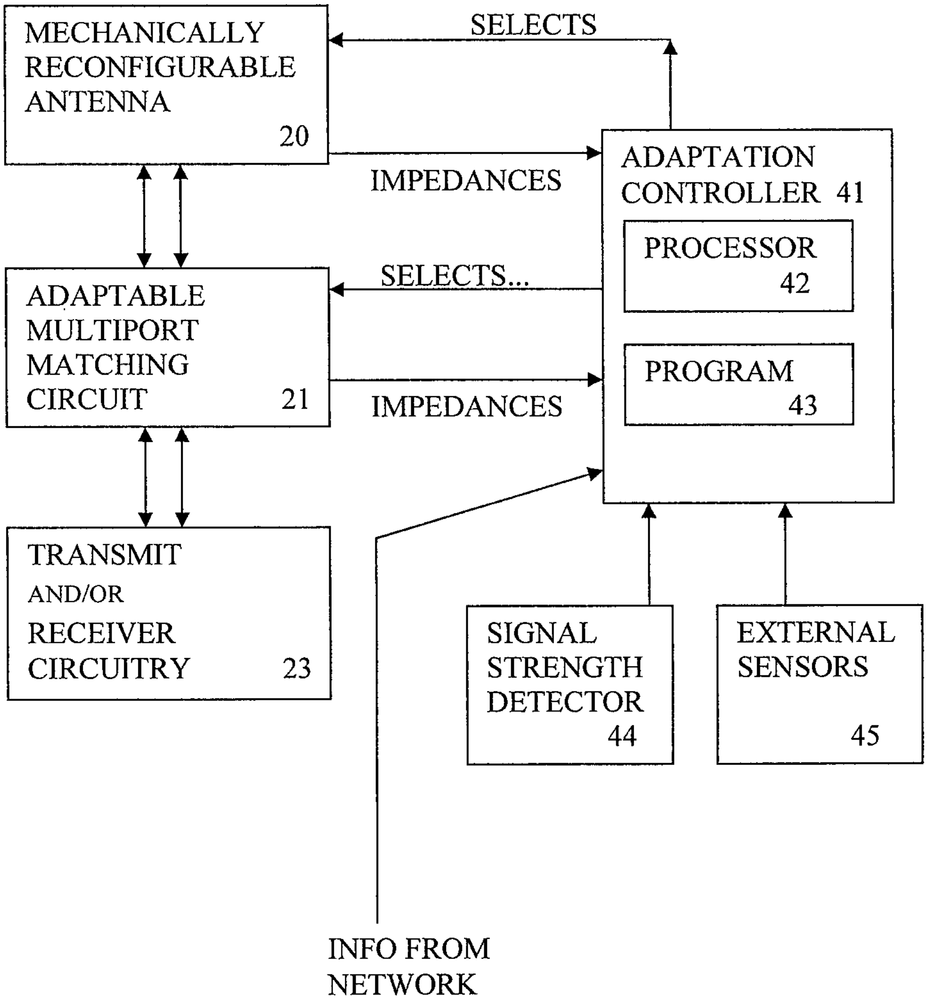
FIG. 4 shows a further embodiment having an adaptation controller.

FIG. 3 shows a schematic view of an embodiment similar to that of FIG. 1*a*, with the addition of a manual or automatic control mechanism 30 for enabling a user or controller to alter the configuration of the mechanically reconfigurable antenna. Trigger signals or a mechanical trigger can be used by the adaptable matching circuit to adapt to a different combination of states. For the case of manual operation the mechanism can have an actuator such as for example a lever changing the antenna state and optionally switching or tuning the matching circuit. Either or both of these functions can alternatively be implemented by an electromechanical actuator which can therefore be controlled by a controller. This can involve changing the relative orientations or relative positions of parts of the antenna, by an electric motor or electro magnet or other means. FIG. 4 shows a schematic view of an embodiment similar to that of FIG. 1*a*, with the addition of a number of features. An adaptation controller 41 is provided for controlling the adaptation. This can be implemented by a processor 42 controlled by a program 43 for example. It can receive inputs from the antenna and from the matching circuit such as impedance measurements. The controller can output control signals such as select signals to adapt the states of the antenna and the matching circuit.

Other inputs to the controller can include for example information from the rest of the wireless network, signal strength information from a detector 44, or reception conditions from external sensors 45 for sensing the environment local to the antenna, such as humidity, ground plane proximity, power levels of the incident and reflected wave on the different ports, and so on.

Figure 5A:
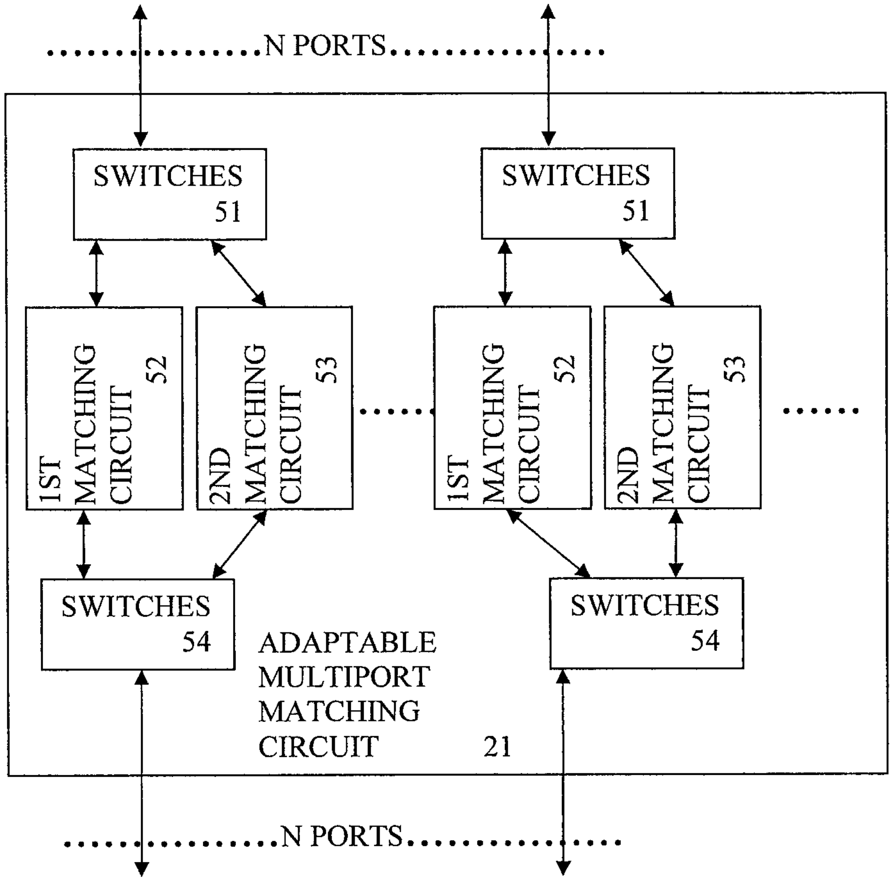
FIG. 5*a* shows a further embodiment having switches for adapting the matching circuit by selecting which matching circuit to use.
Figure 5B:
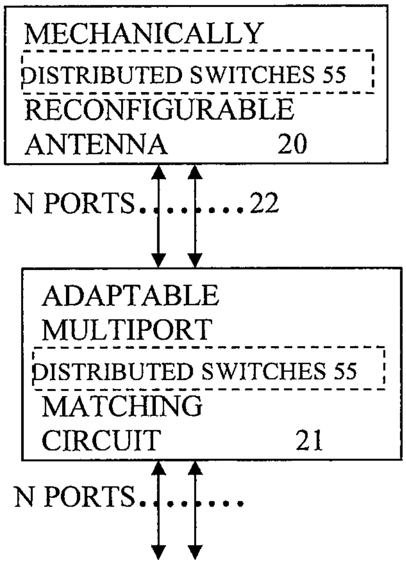
FIG. 5*b* shows a further embodiment having distributed switches in the matching circuit.

FIGS. 5*a* and 5*b* show an example of an adaptable multiport matching circuit 21. FIG. 5*a* shows first and second matching circuits 52, 53. Either of these can be coupled into use by a bank of switches 51 coupled to the antenna and by a bank of switches 54 coupled to the multiple ports. Many other ways of adapting the matching circuit can be envisaged. FIG. 5*b* shows a similar example in which there are distributed switches 55 controlled to change the state of the matching circuit. For example there can be tunable components retuned by the mechanical motion of the antenna, or switches at internal nodes of the matching circuit. Switches are not always needed.

Figure 6:
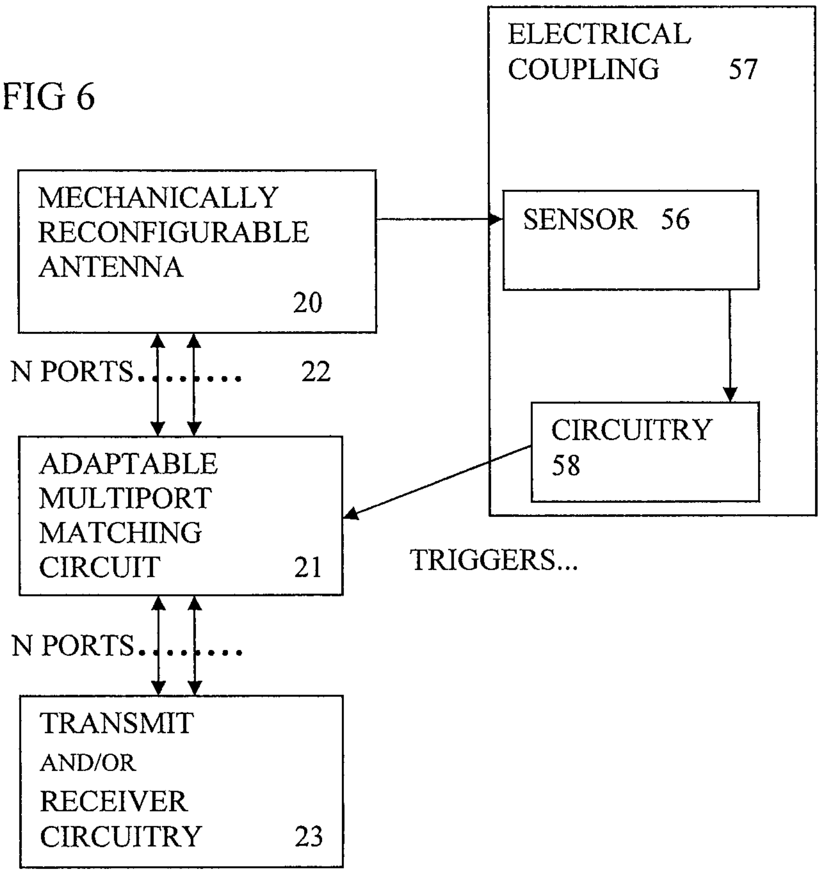
FIG. 6 shows a further embodiment having an electrical coupling.

FIG. 6 shows another example in which an electrical coupling 57 is provided for the adaptation of the combination of states. This can for example have a sensor 56 for sensing a state of the antenna, and circuitry 58 to output trigger signals based on an output of the sensor, to adapt the state of the matching circuit.

In some examples of the antenna, an N port antenna is provided for the extended configuration, some of the ports being part of a mechanically extendible K ports, which are taken out of use when the antenna is in the compact configuration. Thus there are different numbers of ports in the different configurations, either N ports or N-K ports. In some cases an antenna port corresponds to an antenna element, though in other cases, the different ports of the multiport antenna may not be associated with spatially separated or individually identifiable antenna elements but only with different radiation patterns of the overall antenna structure. Also the number of antenna ports can be more than the number of different transmission signals in a spatial multiplexed type of MIMO system.

Figure 7:
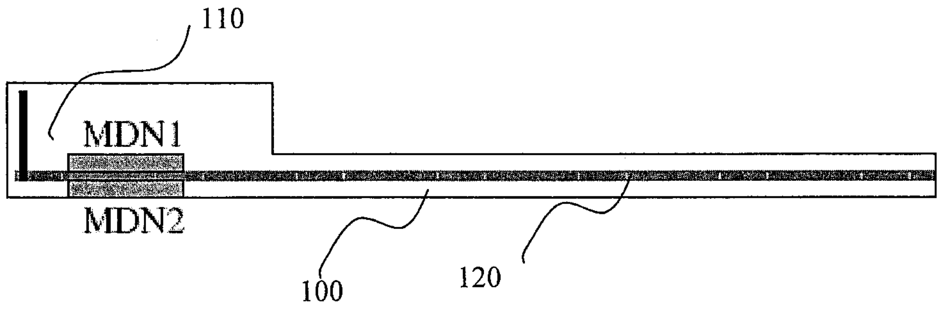
FIGS. 7 to 9 show views of a further embodiment in the form of an insertable card.
Figure 8:
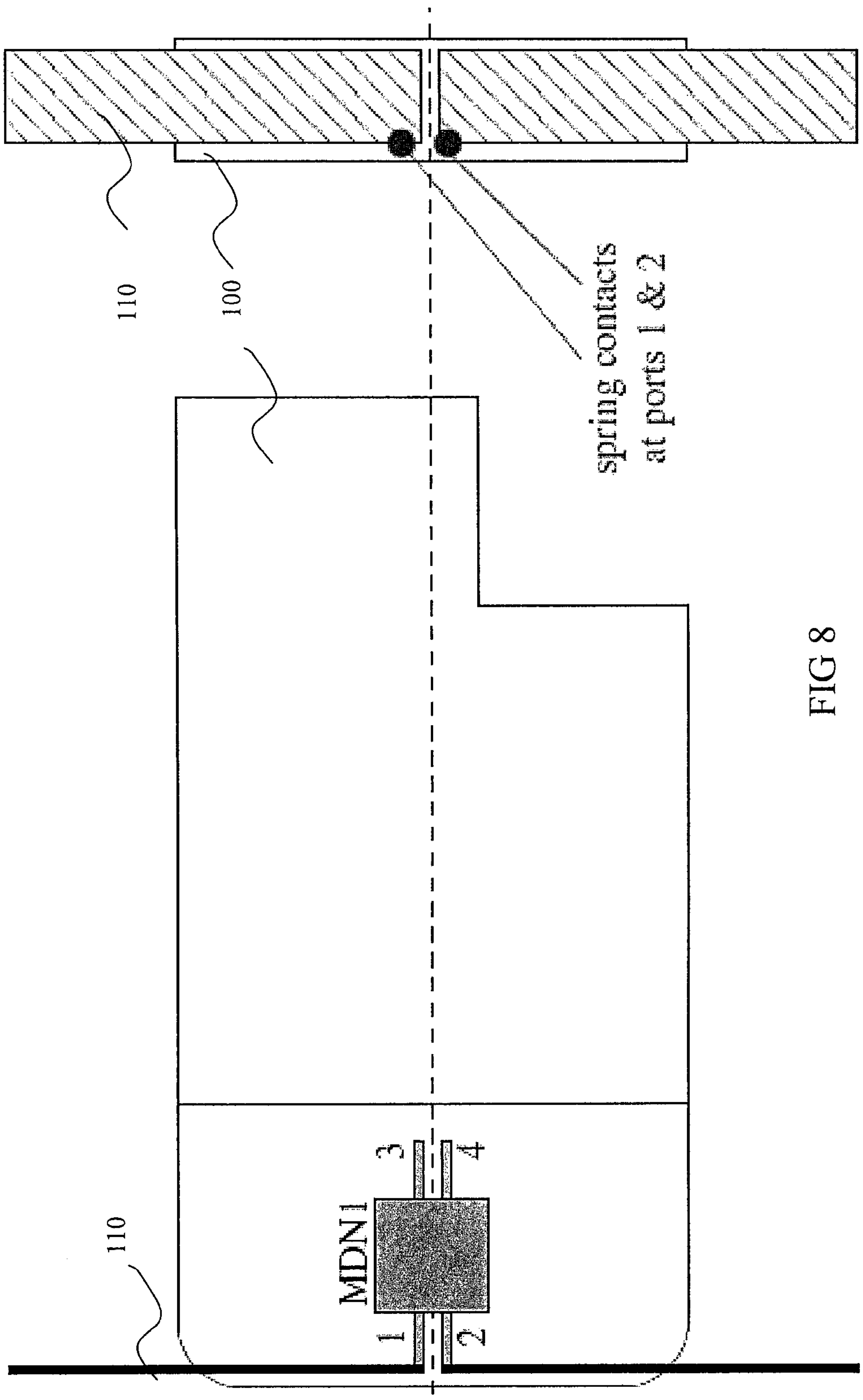
Figure 9:
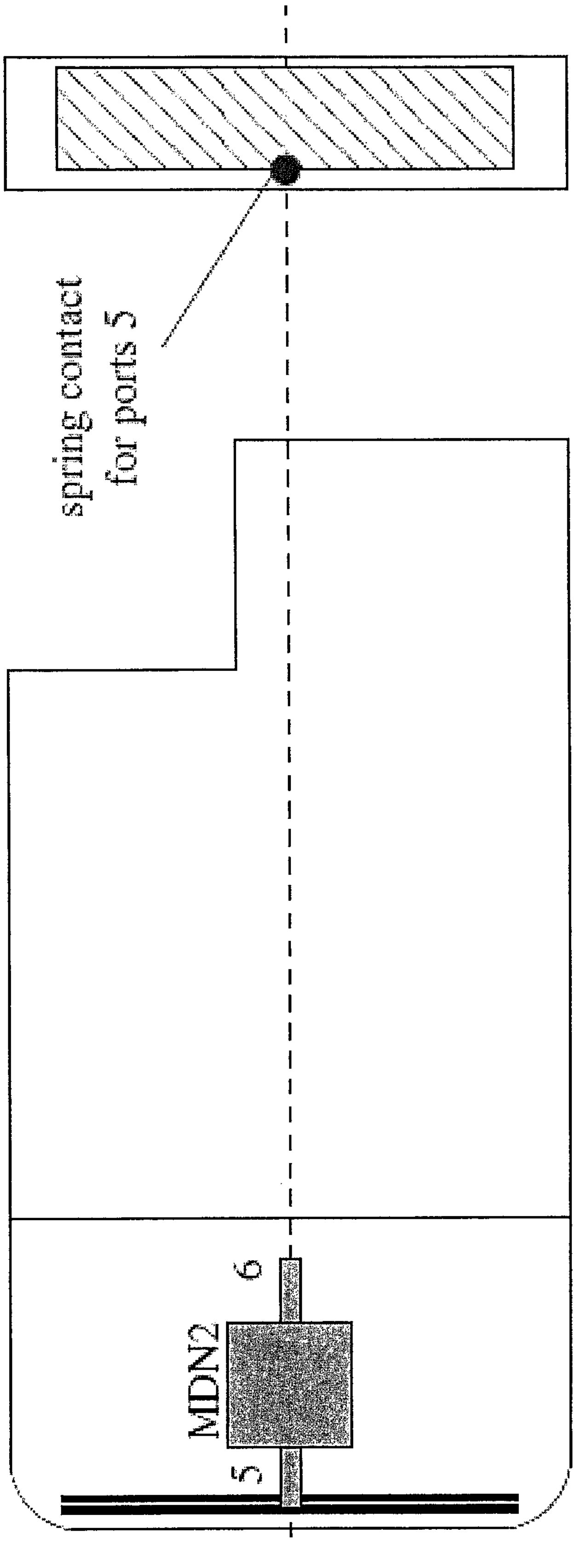

FIGS. 7, 8 and 9, a Card Embodiment, with Monopole and Dipole

Some embodiments of the invention involve a wireless modem equipped with a multi-antenna system which has at least two mechanical states and incorporates an automatic switching between appropriate matching and decoupling networks in agreement with the chosen mechanical state. In this embodiment, an example of a removable module in the form of an Express Card is provided with a dual antenna system. The antenna system may be mechanically switched between an extended state using a MIMO mode (FIG. 8) and a compact state using a non-MIMO mode (FIG. 9). A side view is shown in FIG. 7. The rationale behind this approach is that in a considerable fraction of mobile use cases with intermediate receive conditions non-MIMO mode will be fully sufficient. There are in fact only two cases where MIMO modes are relevant: good receive conditions where SM is possible and poor receive conditions where RD is beneficial.

In the side view, a circuit board 120 is shown in cross section, and is contained in a casing 100. Movable parts of the antenna in the form of fins 110 are shown end on in the side view, and their length is shown in the plan view. Circuit components making up the matching circuit are shown in the side view on the top and bottom of the circuit board by parts MDN1 and MDN2.

In MIMO mode, as depicted in FIG. 8 in plan view at the left side and in an end on view at the right side of the figure. The antenna system combines monopole operation (against the chassis of the laptop) with dipole operation between the two extended fins 110. In this extended mechanical state the two fins of the antenna connect by spring contacts at the top side of the printed circuit board (PCB) to a first matching and decoupling network MDN1 (ports 1 and 2). The matching and decoupling network converts the two electrical modes (monopole: common mode and dipole: differential mode) to two virtually independent signals accessible at ports 3 and 4.

The compact mode is shown in FIG. 9. The same two views are shown as in FIG. 8. The two fins are pushed into the housing to overlap each other, where they remain face to face connected. The size of the structure is too small to support a useful dipole mode at low frequencies in this state. The monopole mode however can still be used. A spring contact at the bottom side of the PCB connects both fins jointly to port 5 of a second matching network MDN2. Port 6 is the matched single antenna port in this state.

The mechanism may be equipped with a spring between the fins such that switching from non-MIMO mode to MIMO mode is possible by pressing a button which releases the spring. Using thumb and index finger the fins can be pushed inside again for transport or non-MIMO operation.

Not shown for the sake of clarity is a further switch which disconnects ports 3 and 4 and instead connects port 6 to the transceiver. The switch can be actuated by the same mechanical action using sliding spring contacts. FIGS. 7 to 9 are given only as examples to illustrate the concept. There are numerous alternative realizations. Also several implementation features, e.g. avoidance of interference with other nearby connectors (by appropriate orientation of the sliding motion of the fins) can be considered.

The approach has a straightforward generalization to N-antenna systems in which case the two electrical modes (common and differential mode) in the example of FIGS. 7 to 9 are replaced by the N eigenmodes of the antenna system. The underlying point is that a mechanical state change is accompanied by an electrical state change in the matching and decoupling network. A more specific aspect is the fact that a size reduction of the antenna system automatically gives rise to a reduction of the maximum rank of the wireless channel which can be realized with the antenna system.

The dimensions of the card in some examples can be around 95 mm by 35 mm, in the plan view. In the extended configuration, the width can extend from 35 mm up to 70 mm. In principle the dimensions are electrically small relative to the wavelengths being used. The dimensions such as width in the extended configuration may be up to a quarter wavelength, or possibly up to a half wavelength. Typical frequencies of operation may be 700 MHz up to 2.6 GHz. In other cases, the frequencies used may be down to 400 MHz or up to 3.5 GHz.

Figure 10:
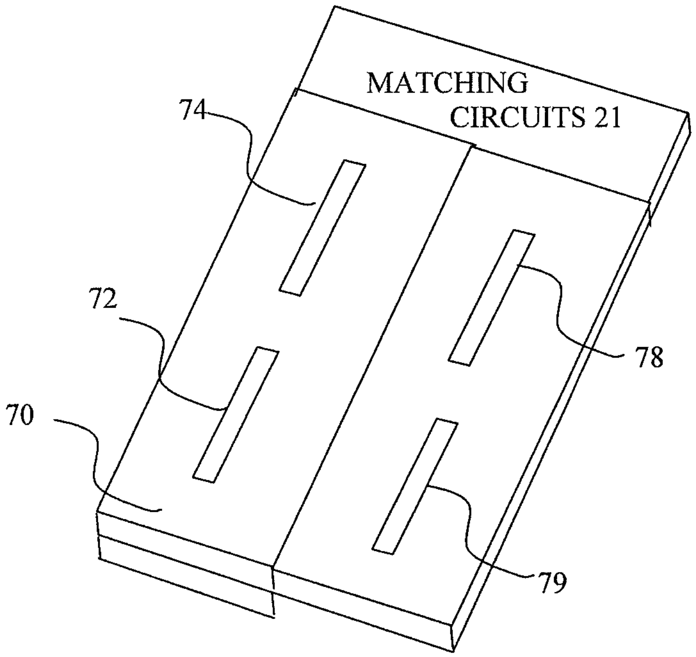
FIGS. 10 to 12 show views of further embodiments of reconfigurable antennas.
Figure 11:
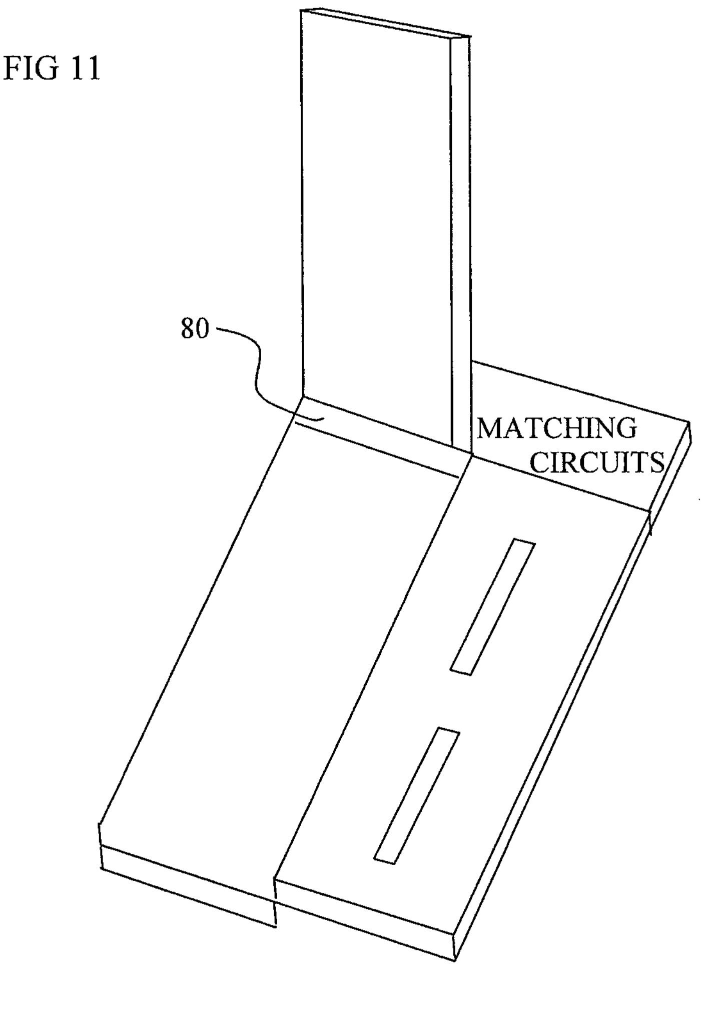
Figure 12:
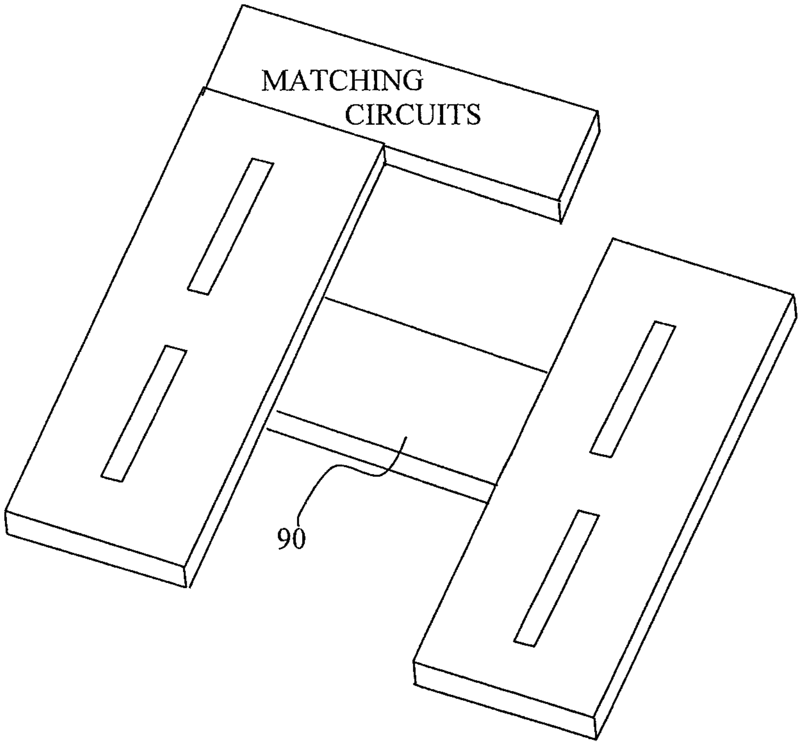

FIGS. 10-12, Further Examples of Reconfigurable Antenna.

FIGS. 10 to 12 show further embodiments in which the antenna has two dipoles, reconfigurable in different ways. In FIG. 10, a compact configuration is shown with a pair of dipoles (72, 74) and (78,79), on a substrate 70. Matching circuits 21 are provided at one end, coupled to receiver and/or transmitter circuitry (not shown). One of the dipoles is hinged to enable its orientation to be changed as shown in FIG. 11. This shows hinge 80 and shows the two dipoles now being oriented orthogonally in an extended configuration. FIG. 12 shows another alternative extended configuration. In this case a slider 90 is provided. This enables the separation between the dipoles to be increased, without changing the orientation. This could be combined with FIG. 11 to change the separation and alter the orientation. There can be more than two dipoles in some examples, each with different orientations or separations.

In principle the compact configuration could be used for a downlink only, with the extended configuration being used when an uplink is needed, or vice versa.

In conclusion, above has been described a wireless device which has receiver circuits (23) and/or transmitter circuits supporting at least two simultaneous independent transmit paths in the same frequency band, and a multiport antenna (20) with N ports (22), for the available receiver or transmitter circuits. The multiport antenna has a compact mechanical state and an extended mechanical state, and is connected to the N ports of the receiver and/or transmitter circuits (23) by means of a 2N-port matching and decoupling network (21). This has multiple, selectable electrical states, each corresponding to at least one of the mechanical states. One combination of the mechanical state and the electrical state allows operation in a wireless channel of rank N. A second combination of the mechanical state and the electrical state allows operation in a wireless channel of rank less than N. Better MIMO performance with the extended antenna configuration can be obtained with the convenience of retaining limited performance when the user cannot use the extended antenna.

Other variations can be envisaged within the claims.

The invention claimed is:

1. Wireless communication device having receiver circuits supporting at least two simultaneous independent receive paths in the same frequency band and/or transmitter circuits supporting at least two simultaneous independent transmit paths in the same frequency band, and having a multiport antenna with at least two ports and a sufficient number N of ports for the available receiver or transmitter circuits, said multiport antenna having multiple mechanical states, comprising at least a compact mechanical state and one extended mechanical state, and being connected to the N ports of the receiver and/or transmitter circuits by a 2N-port matching and decoupling network, which has multiple, selectable electrical states, each corresponding to at least one of the mechanical states of the multiport antenna system such that there is at least one first combination of the mechanical state of the multiport antenna system and the electrical state of the matching and decoupling network which allows for receive and/or transmit operation in a wireless channel of rank N, equal to the larger of the numbers of available receiver or transmitter circuits and to the number of antenna ports, and at least a second combination of the mechanical state of the multiport antenna and the electrical state of the matching and decoupling network allowing for receive and/or transmit operation in a wireless channel of rank less than N.

2. The wireless communication device of claim 1, having a coupling or control mechanism such that, selection of one of the different mechanical states of the multiport antenna or the selection of one of the different electrical states of the matching and decoupling network automatically triggers the selection of the corresponding electrical state of the matching and decoupling network or the corresponding mechanical state of the multiport antenna to adapt the device between the first and the second combinations of the states.

3. The wireless communication device of claim 2 in which the coupling mechanism is operable by direct mechanical action such that a mechanical state change of the multiport antenna causes selection of the corresponding electrical state of the matching and decoupling network, to actuate one or more switches and/or to mechanically induce a change of electrical parameters of reactive or distributed circuit elements within the matching and decoupling network and/or the antenna.

4. The wireless communication device of claim 2 having an electrical coupling having a sensor for sensing the mechanical state of the multiport antenna, and having circuitry to trigger the selection of the corresponding electrical state of the matching and decoupling circuit according to an output of the sensor, the circuitry having electrically controlled switching elements and/or electrically tunable reactive and/or distributed circuit elements within the matching and decoupling network and/or the antenna.

5. The wireless communication device of claim 2, further comprising means to cause selection of the electrical state corresponding to the mechanical state by either actuating one or more switches and/or to induce a change of electrical parameters of reactive or distributed circuit elements within the matching and decoupling network and/or the antenna.

6. The wireless communication device of claim 1, having a manually controllable mechanism for selection of the mechanical state of the multiport antenna and/or the matching and decoupling network.

7. The wireless communication device of claim 1, having an adaptation controller, operable to control the selection of the mechanical state of the multiport antenna and/or the selection of the electrical state of the matching and decoupling network based on criteria selected from the group consisting of measurements of received and/or transmitted signals, measurements of electrical properties of the multiport antenna and/or the matching and decoupling network, information about receive and/or transmit conditions supplied by a digital baseband, information about near-field environmental conditions potentially detected by sensors, information received from another station or a base station of a network with which the device can communicate, and any combination thereof, wherein the wireless communication device comprises at least one selection element selected from the group consisting of electro-mechanical actuators, electrically controlled switching elements, and electrically tunable reactive and/or distributed circuit elements controllable by the adaptation controller for carrying out the selection of the mechanical state of the multiport antenna and/or the selection of the electrical state of the matching and decoupling network.

8. The wireless communication device of claim 1, integrated into a removable module for use with a mobile computing device.

9. The wireless communication device of claim 1, further comprising means to cause selection of the electrical state corresponding to the mechanical state by either actuating one or more switches and/or to induce a change of electrical parameters of reactive or distributed circuit elements within the matching and decoupling network and/or the antenna.

10. The wireless communication device of claim 1, further having said receiver circuits supporting at least two simultaneous independent receive paths in the same frequency band and said transmitter circuits supporting at least two simultaneous independent transmit paths in the same frequency band.

11. A method of using a wireless communication device having receiver circuits supporting at least two independent simultaneous receive paths in the same frequency band and/or transmitter circuits supporting at least two independent simultaneous transmit paths in the same frequency band, and having a multiport antenna with at least two ports and a sufficient number of N ports for available receiver or transmitter circuits, said multiport antenna having multiple mechanical states, comprising at least a compact mechanical state and one extended mechanical state, and being connected to the N ports of the receiver and/or transmitter circuits by a 2N-port matching and decoupling network, which has multiple, selectable electrical states, each corresponding to at least one of the mechanical states of the multiport antenna system such that there is at least a first combination of the mechanical state of the multiport antenna system and electrical state of the matching and decoupling network which allows for receive and/or transmit operation in a wireless channel of rank N, equal to the larger of the numbers of available receiver or transmitter circuits and to the number of antenna ports, and at least a second combination of the mechanical state of the multiport antenna and the electrical state of the matching and decoupling network allowing for proper receive and/or transmit operation in a wireless channel of rank less than N, the method comprising the steps of:

transmitting and/or receiving using the wireless communication device in the first combination of states, adapting the wireless communication device into the second combination of states, and transmitting and/or receiving using the wireless communication device in the second combination of states.

12. The method of claim 11, including the step of automatically triggering selection of the corresponding electrical state of the matching and decoupling network or the corresponding mechanical state of the multiport antenna, depending on a change in the mechanical state of the multiport antenna or a change in the electrical state of the matching and decoupling network, to adapt the device between the first and the second combinations of the states.

13. The method of claim 12, wherein the automatic triggering comprises a direct mechanical action to actuate one or more switches and/or to mechanically induce a change of electrical parameters of reactive or distributed circuit elements within the matching and decoupling network and/or the antenna.

14. The method of claim 12 including the step of sensing the mechanical state of the multiport antenna, and electrically triggering the selection of the corresponding electrical state of the matching and decoupling circuit according to an output of the sensor, using electrically controlled switching elements and/or electrically tunable reactive and/or distributed circuit elements within the matching and decoupling network and/or the antenna.

15. The wireless communication device of claim 12, further including the step of selecting the electrical state corresponding to the mechanical state by either actuating one or more switches and/or to induce a change of electrical parameters of reactive or distributed circuit elements within the matching and decoupling network and/or the antenna.

16. The method of claim 11, including the step of manually altering the mechanical state of the multiport antenna and/or the matching and decoupling network.

17. The method of claim 11, including the step of electrically controlling the selection of mechanical state of the multiport antenna and/or the selection of the electrical state of the matching and decoupling network based on criteria selected from the group consisting of measurements of received and/or transmitted signals, measurements of electrical properties of the multiport antenna and/or the matching and decoupling network, information about receive and/or transmit conditions supplied by a digital baseband, information about near-field environmental conditions potentially detected by sensors, information received from another station or a base station of a network with which the device can communicate, and any combination thereof, wherein the wireless communication device comprises at least one selection element selected from the group consisting of electro-mechanical actuators, electrically controlled switching elements, and electrically tunable reactive and/or distributed circuit elements controllable by the adaptation controller for carrying out the selection of the mechanical state of the multiport antenna and/or the selection of the electrical state of the matching and decoupling network.

18. The wireless communication device of claim 11, further including the step of selecting the electrical state corresponding to the mechanical state by either actuating one or more switches and/or to induce a change of electrical parameters of reactive or distributed circuit elements within the matching and decoupling network and/or the antenna.

19. The method of claim 11, wherein the wireless communication device further includes said receiver circuits supporting at least two independent simultaneous receive paths in the same frequency band and said transmitter circuits supporting at least two independent simultaneous transmit paths in the same frequency band.

20. A wireless communication device having receiver circuits supporting at least two simultaneous independent receive paths in the same frequency band and/or transmitter circuits supporting at least two simultaneous independent transmit paths in the same frequency band, and having a multiport antenna with at least two ports and a sufficient number N of ports for the available receiver or transmitter circuits, said multiport antenna having multiple mechanical states, comprising at least a compact mechanical state and one extended mechanical state, and being connected to the N ports of the receiver and/or transmitter circuits by a 2N-port matching and decoupling network, which has multiple, selectable electrical states, each corresponding to at least one of the mechanical states of the multiport antenna system such that there is at least one first combination of the mechanical state of the multiport antenna system and the electrical state of the matching and decoupling network which allows for only transmit operation in a wireless channel of rank N, equal to the larger of the numbers of available receiver or transmitter circuits and to the number of antenna ports, and at least a second combination of the mechanical state of the multiport antenna and the electrical state of the matching and decoupling network allowing for only transmit operation in a wireless channel of rank less than N.

* * * * *